E. T. SILVIUS.
COMPUTING CHEESE CUTTER.
APPLICATION FILED SEPT. 18, 1912.
1,113,377.
Patented Oct. 13, 1914.
3 SHEETS—SHEET 1.
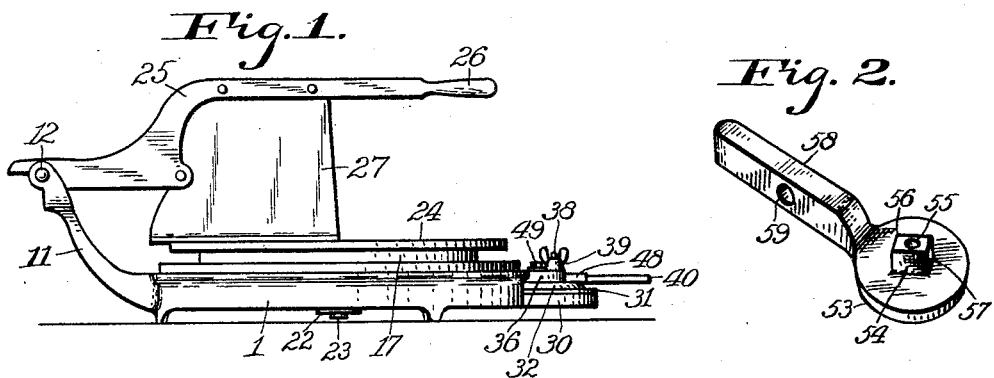
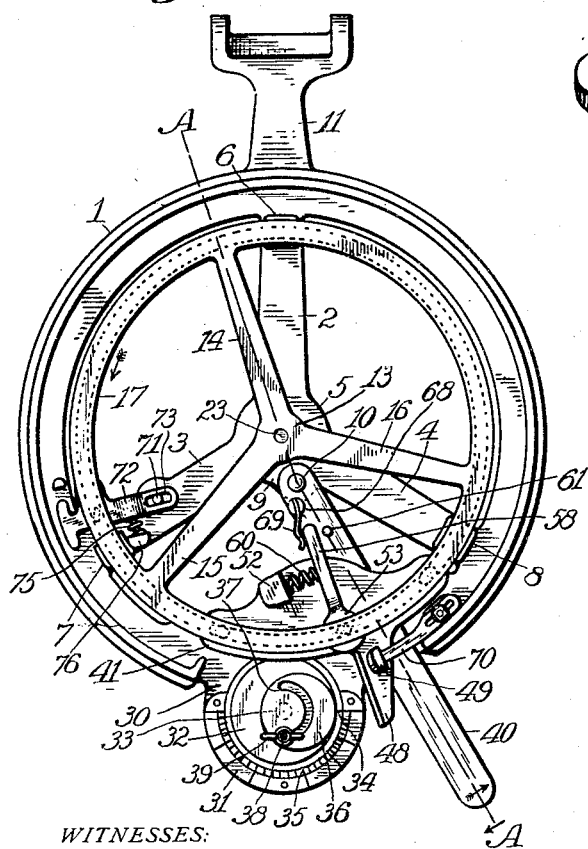
WITNESSES:
J. H. Gardner
M. J. Messenheimer
INVENTOR:
Ellis T. Silvius E. T. SILVIUS.
COMPUTING CHEESE CUTTER.
APPLICATION FILED SEPT. 18, 1912.
1,113,377.
Patented Oct. 13, 1914.
3 SHEETS—SHEET 2.
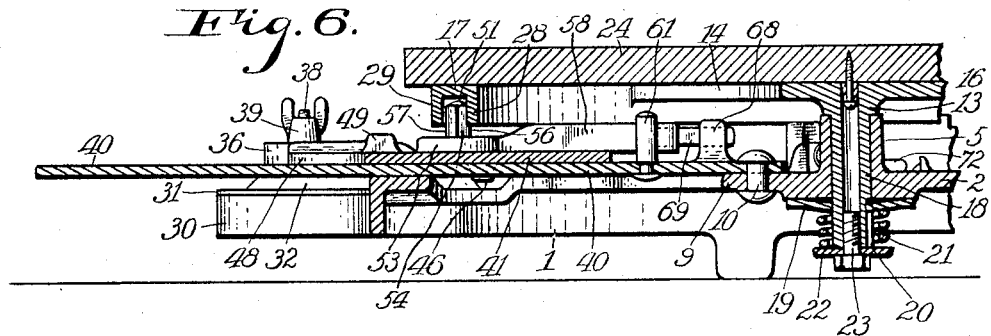
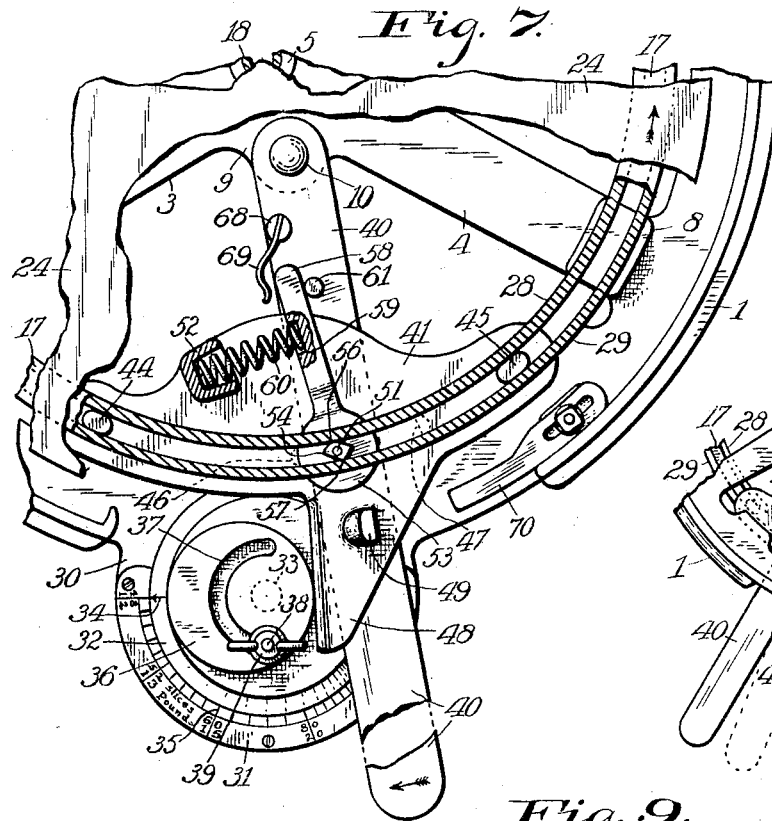
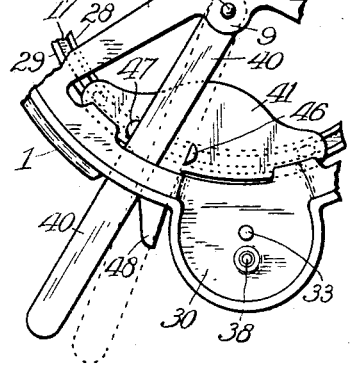
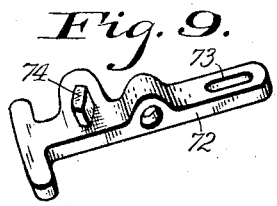
WITNESSES:
J. H. Gardner.
M. J. Messenheimer.
INVENTOR:
Ellis T. Silvius.

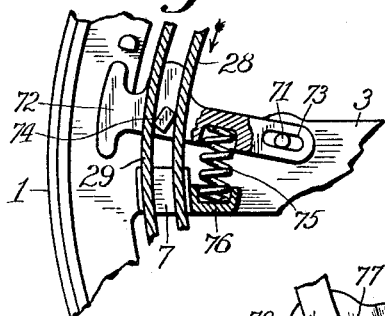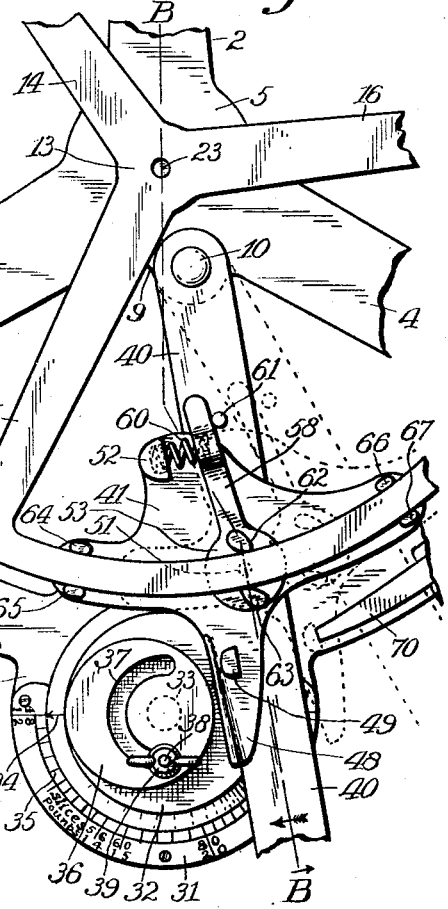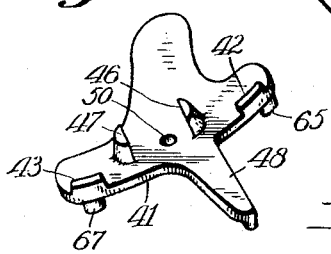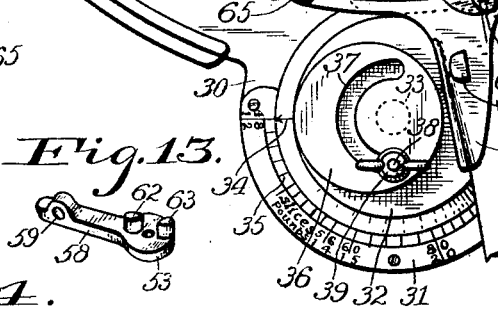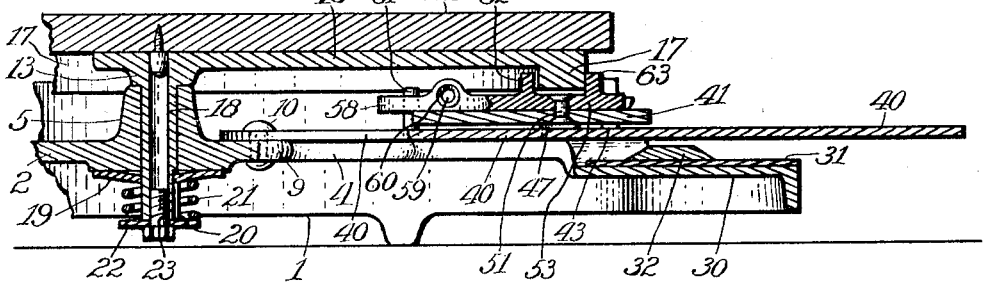

UNITED STATES PATENT OFFICE.

ELLIS T. SILVIUS, OF INDIANAPOLIS, INDIANA, ASSIGNOR TO SPECIALTY MANUFACTURING COMPANY, OF GREENFIELD, INDIANA, A CORPORATION OF INDIANA.

COMPUTNG CHEESE-CUTTER.

1,113,377.  Specification of Letters Patent.  Patented Oct. 13, 1914.

Application filed September 18, 1912. Serial No. 720,992.

*To all whom it may concern:*

Be it known that I, ELLIS T. SILVIUS, a citizen of the United States, residing at Indianapolis, in the county of Marion and State of Indiana, have invented a new and useful Improvement in Computing Cheese-Cutters, of which the following is a specification, reference being had to the accompanying drawings and to the letters and figures of reference marked thereon.

This invention relates to a machine that is designed to divide a cylindrically shaped cheese accurately into parts or slices of predetermined thickness, the invention having reference more particularly to mechanism for turning the cheese measured distances on a frame so as to be accurately divided by the cutting knife with which the machine is provided.

An object of the invention is to provide means for turning and controlling the turn-table on which the cheese is supported in a reliable manner and so that the supporting table shall be turned as far and no farther than is required for accurate division of the cheese into slices or segments, a specific object to that end being to provide positive locking means whereby the actuating element of the mechanism shall be rigidly locked to the turn-table so as to absolutely prevent movement of the turn-table either forward or backward relative to the actuating element during the measuring operations, in order that when the actuating element is moved to turn the table the table shall instantly move with it and shall be instantly stopped when the actuating element is stopped at the end of its stroke.

A still further object of the invention is to provide improved means for locking the actuating element to the turn-table without requiring cog teeth or the like that must entail complications or inaccuracy in action, or a separate momentum arrester usually required with a simple acting clutch that merely moves the turn-table, another object being to provide improved table-turning and measuring apparatus of the above mentioned character that shall be so constructed as to be direct acting and positive, of simple and cheap construction and which shall be durable, reliable and economical in use.

Having the above mentioned and other objects in view, the invention consists in a computing cheese cutter including a turn-table, a movably supported actuating element provided with double acting means for rigidly locking it to the turn-table, the actuating element constituting also a measuring element, means for variably limiting the movement of the actuating element to partially rotate the turn-table, and means for releasing the locking means from the turn-table, said releasing means also preferably serving to actuate the actuating element.

The invention consists also in novel augmenting means for insuring the most rigid connections between the actuating element and the turn-table when the latter is being stopped in case it has been moved with unnecessary rapidity and suddenly stopped, the invention consisting further in the novel parts and in the combinations and arrangements of parts as hereinafter particularly described and claimed.

Referring to the drawings, Figure 1 is a side elevation of a cheese cutter constructed substantially in accordance with the invention; Fig. 2, a perspective view of the main portion of the improved locking means; Fig. 3, a top plan of the improved cheese cutter minus the table top or cheese board and the cutting knife; Fig. 4, a perspective view of the improved actuating element; Fig. 5, a perspective view showing the under side of the improved actuating element; Fig. 6, a fragmentary section approximately on the line A A in Fig. 3 with the cheese board on the turn-table frame; Fig. 7, a fragmentary top plan of the forward portion of the machine in which portions are broken away to disclose operating elements; Fig. 8, a fragmentary inverted plan showing portions of the operating apparatus; Fig. 9, a perspective view of a clutch member for preventing backward movement of the turn-table; Fig. 10, a fragmentary sectional plan view of the apparatus for preventing backward movement of the turn-table; Fig. 11, a fragmentary plan of the improved machine slightly modified; Fig. 12, an inverted perspective view of the actuating element slightly modified; Fig. 13, a perspective view of the device slightly modified for preventing backward movement of the turn-table; and Fig. 14, a fragmentary section approximately on the line B B in Fig. 11 with the turn-table in relatively different position and provided with the cheese board.

Like parts or elements throughout the different figures of the drawings are indicated by like reference characters.

Different portions of the machine may be variously constructed in detail, the main frame thereof preferably comprising an annular portion 1 having a suitable number of arms 2, 3, 4, supporting a hub 5 and a suitable number of bearing blocks 6, 7, 8, the hub having a lateral projection 9 thereon provided with a pivot 10. The rear side of the annular portion 1 has a projecting frame arm 11 thereon provided with a pivot 12.

The turn-table or cheese supporting and carrying table comprises a central hub 13 on which are a suitable number of arms 14, 15, 16, to which an annular portion 17 is connected, to constitute a table frame. The hub 13 is supported upon the hub 5 and has a center pin 18 that extends through the hub 5 to rotate therein. A concavo-convex spring washer 19 is placed on the center pin with its concave side against the under side of the hub 5 and is suitably rotated by the center pin in frictional contact with the hub, the center pin preferably having a groove 20 therein into which a portion of the washer extends to prevent the washer from turning about the center pin. A coil spring 21 is placed on the center pin against the washer 19 and is seated on a collar 22 secured by a screw 23 inserted in the lower end of the center pin. The washer 19 is relatively large in diameter and its edge portion only is in contact with the hub so that considerable frictional resistance is afforded to prevent accidental movement of the turn table frame, the latter having a top or cheese board 24 thereon. A suitable knife frame 25 is connected at one end to the pivot 12 of the frame arm 11 and it has a handle 26 on its opposite end, a suitable cutting knife 27 being secured to the knife frame so as to normally rest upon the turn-table top 24 when not in use.

In carrying out the objects of the present invention it is preferable that the annular portion 17 of the turn-table frame be provided with two downwardly extending concentrically arranged flanges 28 and 29 so that an annular channel is formed between them, the opposite faces of the flanges being turned true and smooth, but it will be apparent that the annular portion 17 may be devoid of the channel if so desired, as will further appear.

A suitable scale or indicator and adjustable stop are provided for determining the amount of movement of the turn-table for cutting a slice of cheese of the required thickness, and these may be variously constructed. Preferably the forward side of the annular portion 1 of the main frame has a forwardly projecting table 30 thereon upon which is secured a scale plate 31, and the table supports a disk-like wheel 32 having a central axle shaft 33 rotatably mounted in the table, the wheel having a beveled edge on one portion of which is an indicating mark 34. The scale plate 31 has a suitable number of graduations 35 thereon arranged in a semi-circle along the edge of the wheel, the graduations being so spaced apart as to indicate the number of slices to be cut from a cheese of known weight and price to afford profit to the retailer, the mark 34 to be set at the required mark on the scale plate as will be readily understood. The wheel 32 has an eccentric block 36 thereon which is cylindrical and is eccentrical to the axis of rotation of the wheel, the block having a curved slot 37 therein that extends through the wheel and is arranged concentrically to the axis of rotation, a binding screw 38 being secured to the table and extending through the slot and provided with a binding screw 39 for securely holding the block in set position. The full portion of the block, or that having the greatest eccentricity, is adjacent to the indicating mark 34.

An operating lever 40 preferably is connected to the pivot 10 or may be otherwise pivotally guided, the outer end portion being guided slidingly on the annular portion 1 of the main frame and may be moved partially over the wheel 32, the lever being a suitable device for operative association with the invention as one of the elements for moving the turn-table.

A suitable actuating element 41 is employed and it may be variously supported and guided below the annular portion 17 of the turn-table and preferably upon or above the lever 40, the element 41 preferably being formed as a plate and having two projections 42 and 43 spaced apart on the under side thereof to be slidingly supported upon the annular frame portion 1, the upper side of the element having guide projections 44 and 45 that extend between the flanges 28 and 29 to be guided thereby. The under side of the element 41 preferably has also two lugs 46 and 47 that extend at opposite sides of the lever 40 and are spaced apart so as to permit lateral movement of the lever between them, the lever when moved into contact with either one of the lugs being thereby enabled to move the actuating element to a less extent than the lever moves. The element 41 has a projecting finger 48 of suitable length thereon that extends forwardly and may be moved over the disk or wheel 32 to the stop block 36 for variably limiting the movement of the actuating element in one direction, the finger preferably having a stop projection or shoulder 49 thereon serving to limit the movement of the actuating element in the opposite direction, the lugs 46 and 47 obviously limiting the movement of the lever 40 relative to the actuating element. Preferably the element 41 has an aperture 50 therein in which a pivot 51 is secured, or the element may be otherwise provided with a pivot or axial stud arranged so as to extend upward between the flanges 28 and 29 and midway between them. The upper portion of the element 41 has an abutment 52 thereon arranged inwardly from the flange 28.

A novel locking element is provided which preferably comprises a guide plate 53 having a locking block 54 thereon, the plate being supported upon the element 41 under the flanges 28 and 29, and the block has an aperture 55 therein that extends through the plate 53 whereby the two portions of the device are rotatably supported and guided on the pivot 51, the block having two frictional engaging cam portions 56 and 57 on opposite sides thereof, the block extending between the flanges 28 and 29, the engaging portions being normally in contact with the opposing faces of the two flanges respectively, one engaging portion being slightly in advance of the other circumferentially of the flanges, so that when the block is slightly turned from normal position the engaging portions are free of the flanges. When the block is rotated slightly in the reverse or to normal position the engaging portions are brought to nearly opposite points into contact with the flanges and when great force is applied the flanges are rigidly locked to the pivot and thereby to the actuating element with a vise-like grip, so that under any operating conditions the turn-table cannot move either forward or backward relative to the actuating element 41, it being equally true that the actuating element when moved must also move the turn-table and when stopped must stop the turn-table. In order to actuate and control the locking block 54 the guide or base plate 53 of the block is provided with an operating and controlling arm 58 that preferably extends inwardly and opposite to the abutment 52. Preferably the arm 58 has a socket 59 therein in which a coil spring 60 is seated, the spring being seated also in the abutment 52 so as to normally force the arm 58 and hold it in normal position, the spring exerting enormous force to effect very rigid locking connections between the block 54 and the flanges 28 and 29. The lever 40 is provided with a lug or projection 61 that is so arranged as to be brought into contact with the arm 58 at the opposite side thereof from the actuating spring 60 for retracting the arm to unlock the actuating element 41 from the turn-table previously to moving the turn-table, the lever after accomplishing the unlocking operation being, as so preferred, further moved until it comes into contact with the lug 46 and thereby moves the actuating element 41.

In case the annular portion 17 of the turn-table frame is not provided with a channel or two flanges the base plate 53 instead of being provided with a single locking block as above described, is provided with two locking projections 62 and 63 arranged at opposite sides of the pivot 51 which is beneath the annular portion 17, the projections extending upward at opposite sides of the annular portion and in normal position are nearly on a transverse plane and opposite sides of the pivot so as to effect rigid locking connection, one projection being slightly in advance of the other when the operating arm 58 is retracted to unlocking position, this relative arrangement being illustrated in Figs. 11 and 14. In this case the actuating element 41 is provided with two guide projections 64 and 65 on one portion thereof extending at opposite sides of the annular portion 17 and two other guide projections 66 and 67 on another portion extending also at opposite sides of the turn-table portion 17.

In some cases in order to augment the power of the spring 60 in case the operating lever is moved with unnecessary violence to move the actuating element, the lever is provided with a suitable support 68 on which is mounted a plate spring 69 that is relatively stiff and extends opposite to the arm 58 but is preferably not in contact therewith when the arm is retracted by the projection 61, the spring 69 being carried into contact with the side of the arm opposite to that engaged by the projection 61 after the projection is carried by the lever away from the arm to permit the locking operations, as may be seen in Fig. 3, so that the spring 69 acts in conjunction with the spring 60. It will be obvious that if the spring 69 is given the required set so as to be in contact with the arm 58 at all times the spring 60 may be dispensed with and its function performed by the spring 69. The annular portion 1 of the main frame is provided with a suitable stop 70 with which the shoulder 49 of the actuating element is brought into contact for stopping the turn-table after having moved it the required distance before severing a slice from the cheese.

Suitable provision is made for preventing the turn-table from accidentally moving backward when moving the actuating element 41 toward the adjustable stop block, a suitable friction clutch preferably being employed, and for this purpose the arm 3 of the frame has a pivotal projection 71 thereon, a lock bar 72 being slidingly supported on the arm and the annular portion 1 of the frame and it has a slot 73 therein receiving the projection 71. The bar extends under the flanges 28 and 29 and has a clutch member 74 thereon to be forced into engagement with the flanges by a spring 75 seated in the bar and also in an abutment 76 fixed on the arm 3, as shown more particularly in Fig. 10, the lock bar being at a suitable angle so that it is released from the flanges when the turn-table moves forward and clutches automatically to prevent the turn-table from moving backward. In case the turn-table frame has no channel the locking bar 72 has two clutch projections 77 and 78 thereon to automatically clutch the annular portion 17 and prevent the turn-table from moving backward but permitting forward movement of the turn-table.

It should be understood that various modifications may fairly be made within the scope of the accompanying claims, as for instance the actuating member 41 may be variously supported and guided and the stops therefor may be variously constructed without affecting the mode of operation of the apparatus for detachably locking the actuating element to the turn-table frame, and the locking apparatus may be variously modified but so constructed as to insure frictional yet rigid locking connection between the actuating element and the turn-table, whether the locking connections are unlocked by the operating lever or otherwise.

In practical use, in the preferred manner, the lever 40 is moved so as to bring the shoulder 49 against the fixed stop 70, and having been stopped the table is then held in its normal rest position and is prevented from moving backward by the locking bar 72, and if now it be desired to cut a slice from the cheese the adjustable stop block 36, if not properly set, is turned and set in accordance with the scale plate and is secured. Then the operating lever 40 is moved toward the adjustable stop block and after moving slightly it carries the projection 61 against the arm 58 for unlocking the actuating element. The lever is usually moved rapidly so that the spring 60 promptly yields without forcing the element 41 backward but the latter may be moved backward slightly if the spring is relatively strong, but the spring yields sufficiently to effect the unlocking operation and may yield somewhat more when the finger 48 comes into contact with the block 36 before the lever 40 comes in contact with the lug 46, the spring in such case serving as a cushion for the stoppage of the lever 40. The extent of movement of the turn-table required is now established and the lever 40 is moved in the opposite direction in order to rotate the turn-table the required distance, and after the lever has moved a short distance it carries the projection 61 away from the arm 58 and thus permits the actuating spring 60 to force the arm 58 over and effectually lock the element 41 to the turn-table before the lever comes into contact with the lug 47 to move the element 41, the movement proceeding until the shoulder 49 is stopped against the fixed stop 70 and stops the lever, the turn table at the same time being positively and accurately stopped with the actuating element. The spring 69, as will be seen, comes into contact with the end portion of the arm 58 slightly before the shoulder 49 is brought to the stop 70 and materially augments the power applied by the spring 60 to the arm. By reference to Fig. 3, it will be clear that preparatory to again setting the table for a cut the arm 40 must be moved somewhat before the projection 61 is moved into contact with the arm 58, and the contact occurs as a hammer blow so as to start the arm suddenly and release the grip of the block 54 or the projections 62 and 63 from the annular portion of the turn-table, and if the spring 60 is dispensed with the element 41 is not moved until the lever comes into contact with the lug 46; with this modification it being clear that the operating lever by means of the spring 69 carried thereby automatically effects the locking operation and also the unlocking operation.

Having thus described the invention, what is claimed as new is:—

1. A cheese cutter including a rotatably supported table having an engagement portion, a movably guided knife for coöperation with the table, and a movably guided actuator provided with movable means adapted for rigidly locking the actuator immediately adjacent to the engagement portion with the table.

2. A cheese cutter including a rotatably supported table, a guided actuator adapted to be moved with or independently of the table, and locking means movably secured on the actuator and normally locked rigidly in engagement with the table immediately adjacent to the connection of the locking means with the actuator, for detachably locking the actuator rigidly to the table adjacent to the point of engagement of the locking means with the table.

3. A cheese cutter including a frame and a table rotatably mounted horizontally thereon, locking means movably supported by the frame and guided by the table for partially rotating and also subsequently stopping the table, and horizontally movable means for controlling the locking means.

4. A cheese cutter including a locking appliance comprising a base plate having a locking block thereon and also an axial aperture extending through the plate and the block, the block having two projecting engaging portions on opposite sides of the aperture, and an operating arm on the base plate.

5. A cheese cutter including a rotatable turn-table, a movable actuating element provided with an axial stud, and a locking element rotatably mounted on the stud and having portions on opposite sides of the stud for engagement with a portion of the turn-table, the locking element having an operating arm.

6. A cheese cutter including a turn-table, a movable actuating element, a locking device comprising a means rotatable on the element for fixedly securing the element to the turn-table and provided with an operating arm, and a pivoted controlling lever for the element movable relatively to the element and provided with means for operating and controlling the arm.

7. A cheese cutter including a rotatable turn-table comprising a continuous engagement portion, an actuating element movable relative to the turn-table and having an axial stud thereon under the engagement portion, and means rotatably mounted on the stud for engaging and locking the engagement portion to the actuating element.

8. A cheese cutter including a rotatable turn-table, a fixed stop, an adjustable stop, an actuating element movable between the stops relative to the turn-table, and a single double-acting lock movably mounted on the actuating element and coöperating with the turn-table for rigidly locking the turn-table to the actuating element.

9. A cheese cutter including a rotatable table having a continuous engagement portion, an actuating element movable under the engagement portion, and movable means coöperating with the actuating element immediately adjacent to the engagement portion and with the engagement portion, for detachably locking the element fixedly to the table to rotate and subsequently stop the table.

10. A cheese cutter including a turn-table comprising two concentric flanges, an actuating element movable under the flanges and having an axial stud thereon extending between the flanges, and a locking block rotatably guided on the stud between the flanges and having two cam portions for engagement with the flanges on opposite sides of the stud, the block having an operating arm.

11. A cheese cutter including a rotatable turn-table, a movable actuating element for the turn-table, a lever for moving the actuating element, a stop to be engaged by the element, and automatic locking means movably mounted on the actuating element for coöperation with the turn-table enabling the element to rotate the turn-table and also to stop the latter when the element engages the stop.

12. A cheese cutter including a rotatable turn-table comprising a continuous engagement portion, an actuating element movable under the engagement portion, a locking element rotatably connected to the actuating element under the engagement portion for locking the element fixedly to the portion and having an operating arm, and guided means movable relatively to the element for coöperation with the arm for retracting the locking element.

13. A cheese cutter including a turn-table, a movable actuating element, locking means rotatably mounted on the element for fixedly securing the element detachably to the turn-table and provided with an operating arm, a pivoted lever provided with means for alternatively engaging opposite sides of the arm for operation thereof to actuate or retract the locking means, and means enabling the lever to move the actuating element following the operation of the arm.

14. A cheese cutter including a frame, a table rotatable on the frame, a fixed stop and an adjustable stop mounted on the frame, a lever pivoted to the frame, a movable actuating element guided concentrically to the axis of rotation of the table between the stops and provided with means for rigidly locking the element to the table and preventing relative movement thereof, means for automatically actuating the locking means to effect the locking operation, means enabling the lever to retract the locking means to unlock the element from the table, and means enabling the lever to move the element alternatively to the stops.

15. A cheese cutter including a frame, a table rotatable on the frame, a fixed stop and an adjustable stop on the frame, an actuating element guided concentrically to the axis of rotation of the table and movable alternatively to the stops, locking means movably mounted on the element for rigidly locking the element to the table and preventing relative movement thereof, a lever pivoted to the frame to move relatively to the element, means enabling the lever on movement in one direction to retract the locking means to permit movement of the element relative to the table, and means for automatically moving the locking means to effect the locking operation on movement of the lever in the opposite direction.

16. In a cheese cutter, the combination with a frame, and a table rotatable on the frame and having a continuous engagement portion, of an actuating element movably supported adjacent to the said portion, an abutment fixed on said element, a base plate rotatably mounted on said element and having means thereon for rigidly locking said element directly to said portion, said plate having an operating arm extending opposite said abutment, a spring between said arm and said abutment for moving the arm in one direction, and a lever pivoted to the frame to move relatively to the element and having a projection thereon movable into contact with said arm for moving the arm in the opposite direction.

17. In a cheese cutter, the combination with a frame, and a table rotatable on the frame and having a continuous engagement portion, of an actuating element movably supported adjacent to said portion, a base plate rotatably mounted on said element and having means thereon for rigidly locking said element to said portion, said plate having an operating arm, a lever pivoted to the frame to move relatively to the element and having a spring mounted thereon for moving the arm in one direction, and means for enabling the lever to move the arm in the opposite direction.

18. In a cheese cutter, the combination with a frame, and a table having a continuous engagement portion and rotatable on the frame, of an actuating element movably supported on the frame, a locking device mounted rotatably on the element immediately adjacent to the engagement portion for fixedly locking the element directly to said portion, a spring coöperating with the element to rotate the locking device in one direction, and movable manually operated means for rotating the device in the opposite direction.

19. In a cheese cutter, the combination with a frame and a table rotatable thereon, of an operating lever pivoted to the frame and having a retracting device thereon, and movable locking means guided by the table and automatically acting on movement of the lever in one direction to rotate the table and subsequently to stop the table when the lever is stopped, the locking means being actuated by said retracting device on movement of the lever in the opposite direction to permit further movement of said lever independentlly of the table.

20. In a cheese cutter, the combination with a frame, a table rotatable on the frame and having a continuous engagement portion, and a knife to coöperate with the frame and the table, of an actuating element guided for movement with the engagement portion, and movable means coöperating with the actuating element for rigidly locking the engagement portion of the table directly to a portion of the actuating element immediately adjacent to the same.

21. In a cheese cutter, the combination of a frame comprising a hub, a table comprising a center pin rotatable in said hub and provided with a head, a concavo-convex washer on said pin to be turned thereby and having its concave side in movable contact with the under side of said hub, and a spring seated on said head and also against the convex side of said washer.

22. In a cheese cutter, the combination with a frame, and a table rotatable on the frame, of a lever guided for pivotal movement and having a controlling device thereon, an actuating device extending over the lever and movably guided by the table, the actuating device being adapted to be moved by the lever subsequent to movement of the latter, and a locking device pivotally mounted on the actuating device and adapted to be locked to the table for moving and subsequently stopping the table, the locking device having a controlling arm thereon controlled by the controlling device.

In testimony whereof, I affix my signature in presence of two witnesses.

ELLIS T. SILVIUS.

Witnesses:
J. H. GARDNER,
P. A. HAVELICK.

Copies of this patent may be obtained for five cents each, by addressing the "Commissioner of Patents, Washington, D. C."